Oct. 11, 1966    M. O'BRIEN    3,277,605
VINE TRAINING DEVICE

Filed March 9, 1964    3 Sheets-Sheet 1

INVENTOR.
MICHAEL O'BRIEN
BY
Lothrop & West
ATTORNEYS

Oct. 11, 1966

M. O'BRIEN 3,277,605

VINE TRAINING DEVICE

Filed March 9, 1964

INVENTOR.
MICHAEL O'BRIEN
BY
Lothrop & West
ATTORNEYS

Oct. 11, 1966 M. O'BRIEN 3,277,605
VINE TRAINING DEVICE
Filed March 9, 1964 3 Sheets-Sheet 3
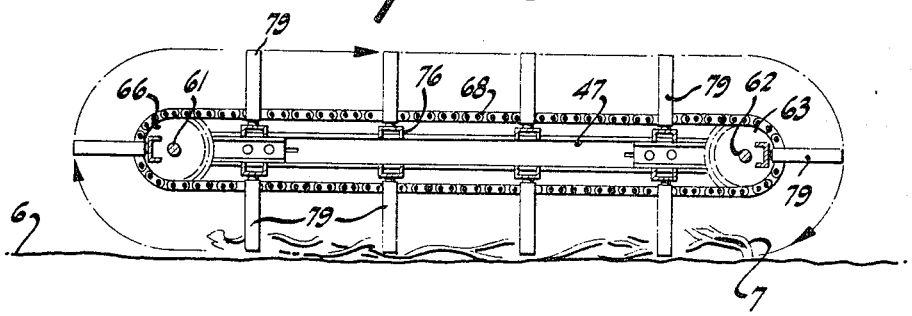
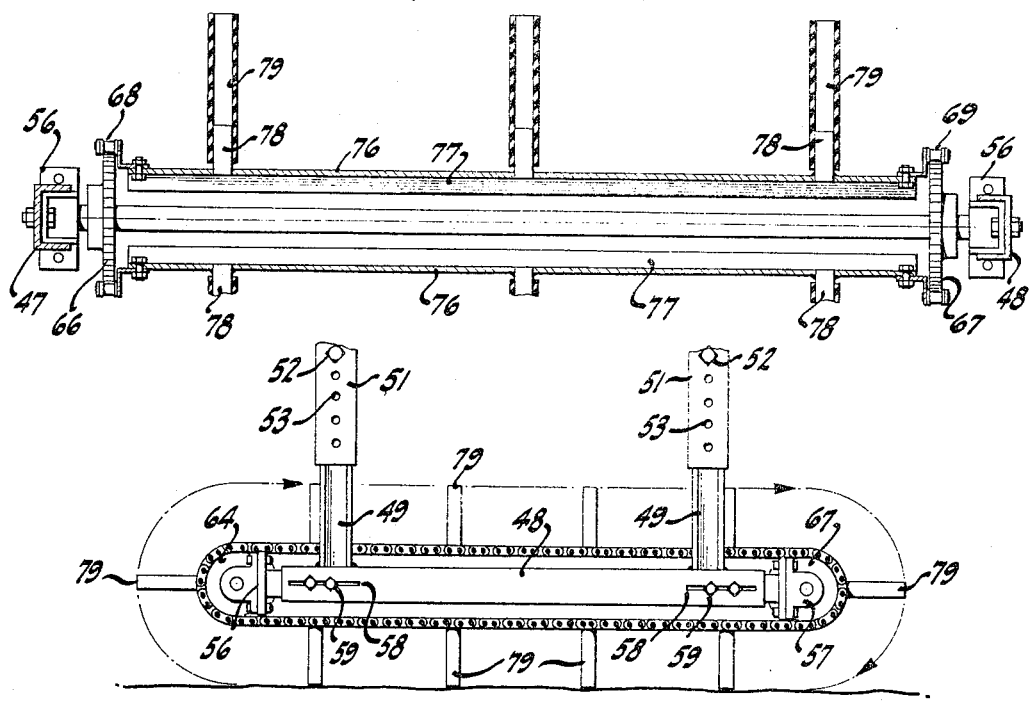
INVENTOR.
MICHAEL O'BRIEN
BY
Lothrop & West
ATTORNEYS United States Patent Office 3,277,605
Patented Oct. 11, 1966

3,277,605
VINE TRAINING DEVICE
Michael O'Brien, Davis, Calif., assignor to The Regents of the University of California, Berkeley, Calif.
Filed Mar. 9, 1964, Ser. No. 350,253
6 Claims. (Cl. 47—1)

My invention relates generally to the mechanized harvesting of melons, particularly cantaloupes, and is especially concerned with a machine for use in preliminarily training melon vines to grow in a particular or predetermined orientation to facilitate future harvesting of their melons by machinery. A related harvesting machine is disclosed in my companion application entitled Melon Harvester and Method of Harvesting Melons, filed Mar. 9, 1964, with Ser. No. 350,252, and some of the subject matter disclosed but not claimed herein is claimed in that companion case.

In the customary manner of raising cantaloupes (for example), the seed is planted in the field and the vines grow at random in all directions. The vines sometimes interengage with adjacent vines and the entire planted area, except for access ways, is nearly or entirely covered by variously extending vine branches.

It is preferred, in order to mechanize the melon harvesting, to have the melon vines all arranged in a regular array and not disposed in random orientation.

It is therefore an object of the invention to provide a mechanism which can be propelled in the melon field to engage and arrange the melon vines so that they all have a predetermined or set orientation.

Another object of the invention is to provide a machine which can be driven in a melon field without endangering the melon vines or the melons and which will be effective to cause the vines to tend to array themselves or to be arrayed in a predetermined pattern.

Another object of the invention is to provide a mechanism for arranging growing melon vines which will not in any way harm the vines themselves nor the resulting or existing melons.

Another object of the invention is to provide a vine training device which can be utilized in various melon fields whether the vines are planted in straight rows or in curving rows.

Another object of the invention is to provide a vine training device in which the parts which engage with the melon vines and may be subject to wear are not only gentle in their vine contact, but can readily be replaced.

Another object of the invention is to provide a vine training device which can be operated in a growing field at any selected or desired speed, but which will nevertheless arrange the vines as desired.

While the vine training device of the invention has been successfully embodied in connection with the harvesting of cantaloupes, it is likewise useful in connection with the pre-arrangement of vines for other melons, such as honeydew melons, Persian melons, and the like. For convenience herein, the device is described as it has been particularly arranged and proportioned for the training of cantaloupe vines.

With the foregoing understanding, the above-mentioned objects, together with others, are attained in the form of machine described in the accompanying description and illustrated in the accompanying drawings, in which:

FIGURE 3 is a cross section, the plane of which is indicated by the line 3—3 of FIGURE 2;

FIGURE 4 is a cross section, the plane of which is indicated by the line 4—4 of FIGURE 2; and FIGURE 5 is an elevation, the plane from which the view is taken being indicated by the line 5—5 of FIGURE 2.

Figure 1:
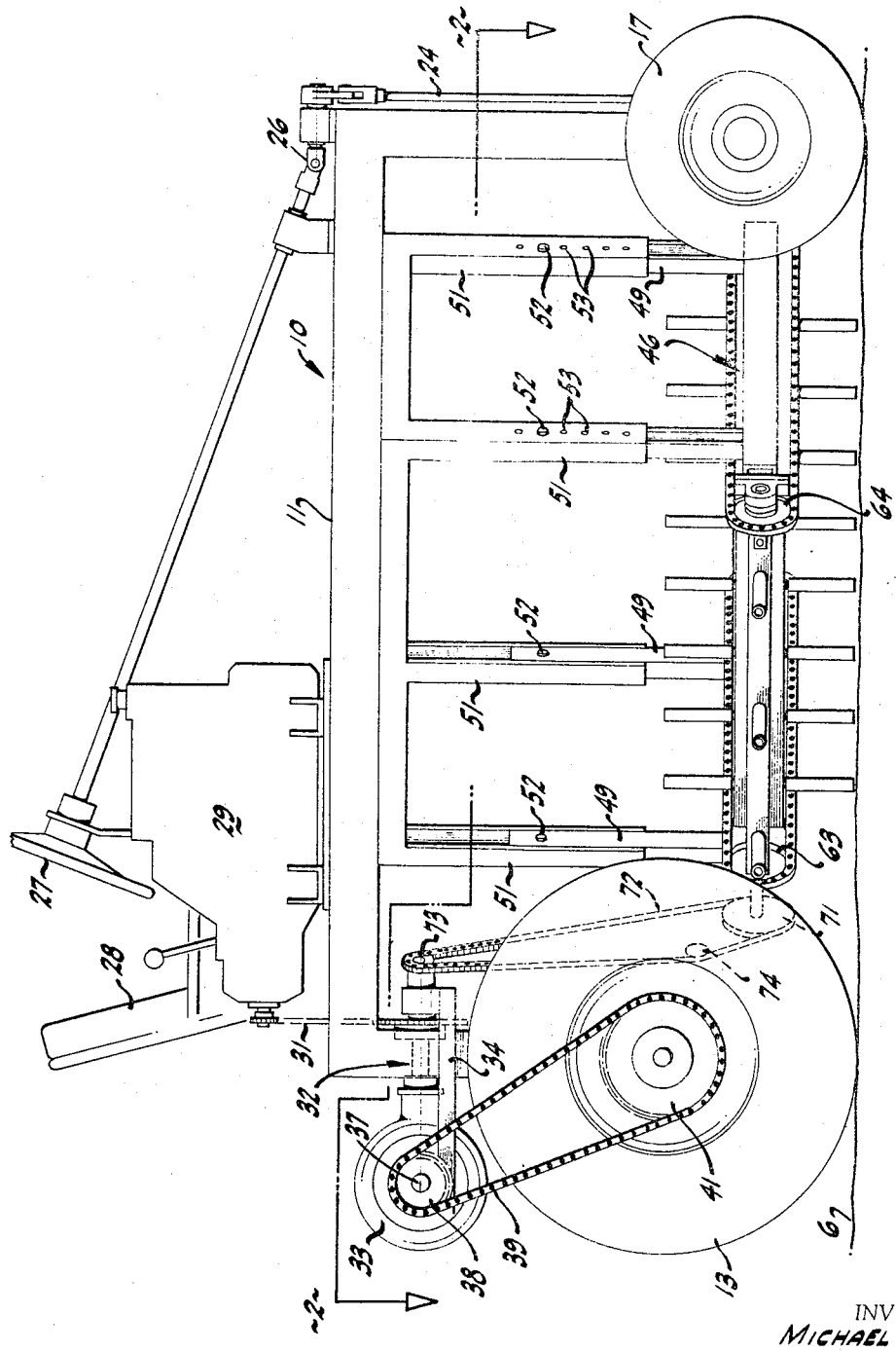
FIGURE 1 is a side elevation of a vine training device constructed pursuant to the invention.

In carrying out the present invention, it is preferred that the seeds for the melon vines be initially planted in a field 6 so that the seeds result in the production of vines having trunks 7. The several vine trunks grow at spaced intervals in a line or path 8, preferably rectilinear, although any configuration for the path is suitable. The predetermined direction of the path and the direction in which the trunks are spaced is indicated by the arrow 9. This also represents the direction of advance of the training device in the field.

Designed to cooperate with the so-planted vines is a machine having a main frame 10 fabricated of suitable metallic shape including parallel longitudinal side rails 11. The main frame 10 is supported on a pair of ground-engaging drive wheels 12 and 13 at the rear of the machine (with respect to the direction of advance 9) and also is supported on a pair of forward, dirigible ground-engaging wheels 16 and 17. The wheels 12 and 13 are conveniently mounted on a dead axle 18. The forward wheels 16 and 17 are connected by an axle 19 at the ends of which steering spindles 21 and 22 are mounted. A steering linkage 23 connects the spindles 21 and 22 and is joined by an actuating rod 24 and suitable connecting mechanism 26 to a steering wheel 27 near an operator's seat 28.

Appropriately mounted on the frame 10 adjacent the driver's seat 28 is a suitable engine 29 serving as a source of power. The engine is connected through a chain 31 to a drive shaft 32 leading into a differential 33 mounted on an extension 34 of the frame 10 and driving a pair of axle shafts 36 and 37. At the outer extremity of both axle shafts, sprockets 38 are connected by chains 39 to sprockets 41 connected to the outboard side of the wheels 12 and 13. When the engine 29 is operated, drive is transmitted differentialy to the ground-engaging wheels 12 and 13. By regulating the speed of the engine 29, the operator can control the speed of advance of the frame 10. By manipulating the steering wheel 27, he can direct the frame closely to follow the contour of the row 8. The transverse distance between the wheels 12 and 13 and between the wheels 16 and 17 is sufficient to have the wheels operate on ground not normally covered by vines. The major portion of the frame 10 straddles the vines and the wheel mechanism does not in any way come into contact with or injure the vines.

Particularly pursuant to the invention, I provide a trainer frame 46 at a selected elevation with respect to the field 6 or ground level. The frame 46 conveniently includes a pair of side channels 47 and 48 (FIGURE 4). These channels are suspended from two pairs of uprights 49, each telescoping within a corresponding channel 51 depending from the main frame 10. By removable fastenings 52 lodged in appropriate ones of a series of openings 53 in the channels and uprights, the vertical height of the trainer frame 46 can be established. The wheels 12 and 13 as well as the wheels 16 and 17 also serve as gauge wheels to support the frame 46 at an appropriate height above the ground.

The location or disposition in plan of the trainer frame 46 with respect to the main frame 10 is preferably at a diagonal or at an angle with respect to the side members 11 of the main frame 10 and with respect to the direction 9 of advance or the direction of the row 8. The side channels 47 and 48 at their ends carry bearing supports 56 and 57. The bearing supports are adjustably mounted by means of elongated openings 58 and securing bolts 59.

Extending between aligned pairs of the bearing mounts are rotatable conveyor shafts 61 and 62 (FIGURE 2) serving as supports for driving sprockets 63 and 64 on the shaft 62 and driven sprockets 66 and 67 on the shaft 61. Trained around the pairs of sprockets are conveyor chains 68 and 69 to provide an upper run and a lower run substantially parallel to the ground. Also mounted on the shaft 62 is a driven sprocket 71 connected by a chain 72 to a sprocket 73 on a forward extension of the drive shaft 32. An idler 74 maintains the chain 72 tight, the chain being positioned at an angle in order to transmit drive from the longitudinal shaft 32 to the angled shaft 62.

Extending between and fastened in place at the ends to the chains 68 and 69 are cross bars 76 (FIGURE 4) preferably including reinforcing flanges 77. At appropriate intervals, each of the bars is provided with upright bosses 78 of appropriate length and diameter to receive flexible, tubular hoses 79 constituting training fingers. The arrangement is such that a large number of training fingers extend outwardly from the bars 76 and are of a length so as to closely approach the ground level 6 or, if they actually abut the ground, the flexibility of the fingers permits some deflection. The hoses or tubes 79 are customarily fabricated of reinforced rubber and have sufficient flexibility to yield against major forces so as not to injure any vines or injure or dislodge any melons with which they come into contact.

Figure 2:
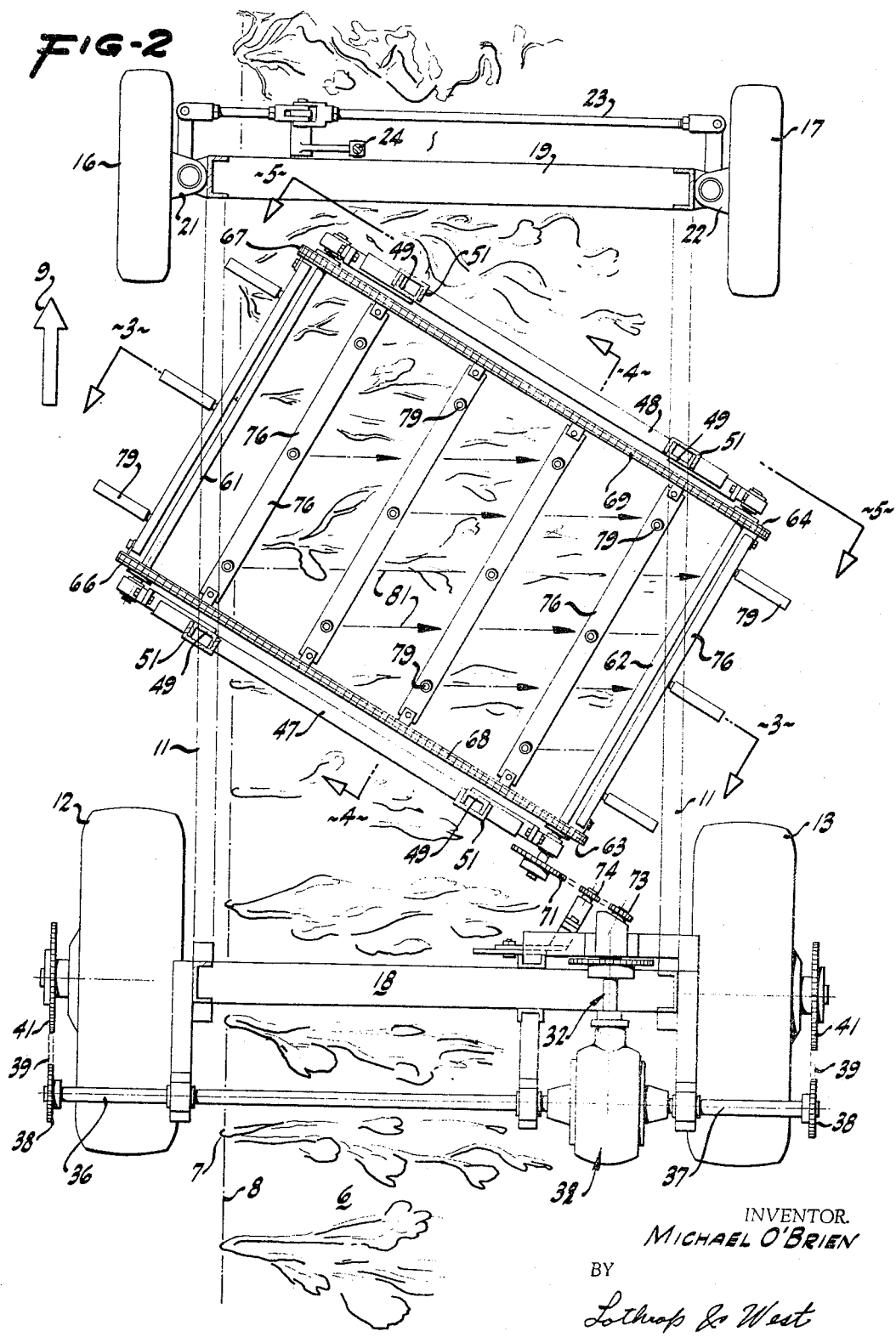
FIGURE 2 is a plan of the machine illustrated in FIGURE 1.

The driving chain 72 operates the training conveyor on the training frame 46 in such a direction as to move the fingers 79 in the lower run of the belt diagonally with a component from left to right as seen in FIGURE 2 and, considering the main frame 10 as a reference, with a component from the front toward the rear. Particularly in accordance with the invention, the driving ratio or speed ratio from the common drive shaft 32 to the ground-engaging wheels 12 and 13 and to the training conveyor is such that as the main frame 10 advances in the direction 9, the fingers 79 in the lower run of the conveyor partake of a motion with respect to the ground as indicated by the broken arrows 81 in FIGURE 2. The direction of this motion is normal to or perpendicular to the predetermined direction 9 or the direction of advance of the main frame 10.

Stated differently, while the fingers 79 operate in a diagonal direction with respect to the main frame 10 on which they are mounted, the component of forward advance of each finger 79 in the lower run due to the advance of the frame 10 and the transverse or lateral component of each finger due to the diagonal movement of the trainer conveyor are so related that the motion of each finger 79 relative to the field 6 or ground is as nearly as possible normal or perpendicular to the direction of advance 9 or, for that matter, with respect to the side frame members 11 of the main frame. Otherwise considered, the rearward motion component of the lower run fingers relative to the main frame 10 is equal to the forward motion of the frame 10 relative to the ground 6. These components cancel each other and leave the lateral component.

In the operation of this machine in the field, an early operation in the direction of the arrow 9 is accomplished shortly after the young melon vines have sprouted and have only extended short distances from their trunks 7. The young vines are engaged by the fingers 79. All extending portions of the vine are moved by the fingers with respect to their original locations, if necessary, and all are left, after the machine has passed, with their general orientation all on one side of the vine trunk 7 and extending transversely of the direction of advance. As the vines grow and new branches develop, other passes over the row are made by the vine trainer so that the vines are arranged or "combed" several times during the growing season. Thus their general direction of growth is always maintained on one side of the trunk and extending transversely of the row. The tread of the machine is such as to encompass the greatest length to which the vines normally grow, so that no portions of the vines are run over.

The frame 10 can be operated at any desired speed of advance in the field, since the ground-engaging wheels and the fingers 79 are geared together at a set ratio. This ratio depends in part on the angularity of the conveyor frame with respect to the main frame 10, but is chosen so that the fingers 79 always in fact move evenly and transversely with respect to the ground to array the vines in a crosswise pattern all on one side of the vine trunks 7. The driving ratio can be so chosen that the vines are not mathematically or exactly normal to the direction of advance and can be inclined forwardly or rearwardly, but are still roughly crosswise in a predetermined array as distinguished from random orientation.

In accordance with this invention, there has been provided an easily operated field implement which can be driven in a melon vine field without any damage to the vines or melons. When utilized once or more during the vine growing season, the machine is effective to array the vines in a predetermined orientation, each vine being roughly parallel to the other vines and extending away in one direction from the vine trunks, an arrangement positioning the vines for subsequent mechanical harvesting of the melons.

What is claimed is:

1. A vine training device for planted vines having their trunks spaced apart in a predetermined direction comprising a main frame, means for supporting said main frame over some of said vines for advancement in said direction, means for advancing said main frame on the ground in said direction, a training frame, means for mounting said training frame on said main frame, a conveyor mounted on said training frame for movement at an angle to said direction and having an upper run and a lower run, training fingers projecting from said conveyor a distance spaced from said ground when on said lower run, and means for driving said conveyor at a speed relative to the speed of advance of said main frame in said direction to move said training fingers on said lower run in a direction perpendicular to said direction.

2. A vine training device for planted vines having their trunks spaced apart in a predetermined direction comprising a main frame movable on the ground in said direction, a training frame, means for mounting said training frame on said main frame and to extend over some of said vines, a conveyor having an upper run and a lower run, means for mounting said conveyor on said training with said lower run disposed at an angle to said direction, training fingers projecting from said conveyor and spaced from said ground when on said lower run, and means for driving said conveyor at a speed relative to the movement of said main frame in said direction to move said fingers in said lower run in a direction perpendicular to said direction.

3. A vine training device for use with vines planted in a field with the vine trunks spaced apart in a row extending in a predetermined horizontal direction comprising a main frame, means for supporting said main frame in said field and straddling said row for advancement in said direction, a plurality of training fingers, means for mounting said training fingers on said main frame for movement relative to said main frame in a horizontal plane in a diagonal direction relative to said predetermined direction, and means for driving said main frame to advance at a predetermined speed in said predetermined direction and driving said training fingers at a speed relative to said predetermined speed effective to move said training fingers in a horizontal direction perpendicular to said predetermined direction.

4. A vine training device for use with vines planted in a field with the vine trunks spaced apart in a row extending in a predetermined direction comprising a main frame, means for supporting said main frame in said field and straddling said row for advancement in said direction, a plurality of training fingers, and means on said main frame for supporting said training fingers close to but spaced from said field and for horizontally moving said fingers perpendicular to said direction relative to said field during advancement of said main frame in said direction.

5. A vine training device for use with vines planted in a field with the vine trunks spaced apart in a horizontal row extending in a predetermined direction comprising a main frame, ground-engaging wheels for supporting said main frame in a position straddling said row, a training frame, means for mounting said training frame on said main frame in a position between said wheels, a plurality of training fingers, means for mounting said training fingers on said training frame to depend therefrom and for movement in a horizontal path that is diagonal with respect to said predetermined direction, and means for moving said training fingers including a mechanical connection to at least one of said ground-engaging wheels at a ratio to move said fingers relative to the ground solely in a direction perpendicular to said predetermined direction.

6. A vine training device as in claim 5 in which said training frame is vertically movable with respect to said main frame whereby said training fingers can be spaced above the ground.

References Cited by the Examiner
UNITED STATES PATENTS

| | | | |
|---|---|---|---|
| 2,545,723 | 3/1951 | Conner | 56—376 |
| 2,699,639 | 1/1955 | Lambert et al. | 56—376 |

ABRAHAM G. STONE, *Primary Examiner.*
R. E. BAGWILL, *Assistant Examiner.*